(12) United States Patent
Wang

(10) Patent No.: US 10,017,308 B2
(45) Date of Patent: Jul. 10, 2018

(54) DISPLAY CONTAINER

(71) Applicant: ARIA PRODUCTS L.L.C., Dover, DE (US)

(72) Inventor: Daniel Wang, Chung Hua Hsien (TW)

(73) Assignee: ARIA PRODUCTS L.L.C., Dover, DE (US)

( * ) Notice: Subject to any disclaimer, the term of this patent is extended or adjusted under 35 U.S.C. 154(b) by 302 days.

(21) Appl. No.: 15/133,762

(22) Filed: Apr. 20, 2016

(65) Prior Publication Data

US 2017/0305625 A1 Oct. 26, 2017

(51) Int. Cl.
| | | |
|---|---|---|
| *B65D 25/04* | (2006.01) |
| *B65D 71/16* | (2006.01) |
| *B65D 5/02* | (2006.01) |
| *B65D 71/22* | (2006.01) |
| *B65D 71/12* | (2006.01) |

(52) U.S. Cl.
CPC ............ *B65D 71/16* (2013.01); *B65D 5/0254* (2013.01); *B65D 71/12* (2013.01); *B65D 71/125* (2013.01); *B65D 71/22* (2013.01)

(58) Field of Classification Search
CPC ...... B65D 71/16; B65D 5/0254; B65D 71/12; B65D 71/22; B65D 71/125; B65D 5/4204; B65D 2571/00314; B65D 71/246

USPC ......... 229/120.32, 120.21, 164, 120.06, 150, 229/162.1, 162.7; 206/736, 737, 740, 206/745, 776
See application file for complete search history.

(56) References Cited

U.S. PATENT DOCUMENTS

| | | |
|---|---|---|
| 4,320,830 A | 3/1982 | Roccaforte |
| D309,262 S | 7/1990 | Coiner |
| 5,692,611 A | 12/1997 | Harrison |
| D436,313 S | 1/2001 | Joshua et al. |

FOREIGN PATENT DOCUMENTS

CN 203450509 U 2/2014

*Primary Examiner* — Christopher Demeree
(74) *Attorney, Agent, or Firm* — Muncy, Geissler, Olds & Lowe, P.C.

(57) ABSTRACT

A display container includes a rear panel, two side panels, a first support structure enclosing first edges of the two side panels and the rear panel, a second structure distancing from the first support structure for enclosing second edges of the two side panels and the rear panel, and a reception cavity formed thereby. The display container is featured that the first support structure is foldable along fold lines and formed by a first planar panel, a face panel, a first interior panel and a foot flap in order. A cutout is formed on the first interior panel and is described by a restraint edge. The foot flap retains against the rear panel; the foot flap has at least one tongue registering at least one tongue slit defined at the rear panel.

14 Claims, 7 Drawing Sheets

DISPLAY CONTAINER

BACKGROUND

1. Technical Field

The present disclosure relates to a display container, specifically to a display container by folding sheets of material.

2. Background of the Invention

For display packaging, it is well-known to provide support platform to orient articles of irregular shape to optimize presentation to consumer. Typically such platform imposes restriction on how much the consumer can tactilely and visually check the articles.

U.S. Pat. D436313 discloses a typical display container with a support platform. The display container provides an opening on the front panel; however, because the support platform by itself does not prevent the article from getting loose, the opening has to be reduced. Furthermore, the support platform is constructed from a separate packaging blank, therefore requiring extra material.

U.S. Pat. D309262 and U.S. Pat. No. 4,320,830 each discloses a display container with a support platform constructed from the primary packaging blank. Here again the opening on the front panel has to be reduced to prevent the article from falling out of the container.

U.S. Pat. No. 5,692,611 discloses a display container with dual support platforms constructed from the primary packaging blank while offering a large opening for tactile and visual check. In the packaging process, the worker or the machine has to put the article at the center of the packaging blank, simultaneously fold the two support platforms toward the article, then securing the article by sliding its top and bottom toward corresponding openings on the platforms. Such packaging process is complicated and time consuming. The packaging also requires the two platforms be secured by gluing or stapling so that the platforms will not "unfold" themselves. Furthermore, the packaging is only capable for accommodating a light-weight article.

Chinese Pat. 201320589717.5 discloses a display container with dual support platforms constructed from the primary packaging blank while offering dual openings. The dual openings limit the amount of graphic indicia on the packaging, and therefore the packaging is not suitable for certain articles.

Especially referring to articles with uneven configuration thereof with bulges out or with projections, to articles being of heavy weight, or to articles with specific functional face, existing packages offer no satisfactory solution. For example, for a sprinkler timer having an operation panel, which is the specific functional face, being somewhat heavy itself and including at least two hose ports respectively arranged on top and bottom ends thereof, a typical display container would not provide a large opening in an economic manner.

In the interest of manufacturing economy and attractive merchandising, a display container for an irregular article needs to provide a large opening for tactile and visual check, offer a quick packaging process, and preferably be constructed from one unitary packaging blank.

SUMMARY

It is therefore for one or more aspects to provide a display packaging which is formed by folding sheets of material, with an opening as large as possible for allowing visual and tactile check of a specific face of an article.

It is therefore for one or more aspects to provide a display packaging that firmly accommodates an irregular article to protect the article from being lost or stolen as find itself difficult to open.

It is therefore for one or more aspects to provide a display packaging that can be erected easily without the tendency of the container "unfolding" itself.

It is therefore for one or more aspects to provide a display packaging that is environmentally friendly due to minimal material usage and no use of plastics.

To achieve objects of the present disclosure, a display container including a rear panel, two side panels, a first support structure, means for reinforcement, a second support structure, and a reception cavity is disclosed. The rear panel defines a first transversal edge, a second transversal edge opposite to the first transversal edge, two lateral edges and at least one tongue slit adjacent to a respective one of the first transversal edge and the two lateral edges. The two side panels are approximately symmetrical with each other, wherein each of the side panels defines a rear edge, a front edge opposite to the rear edge, a first edge, and a second edge opposite to the first edge. At least one of the rear edge connects a respective one of the two lateral edges of the rear panel. The first support structure is disposed adjacent to the first transversal edge of the rear panel and encloses the first edges of the two side panels. The first support structure is folded via an extension sheet, whereon plural of primary fold lines are defined and generally parallel with one another. The primary fold lines intersects the extension sheet and spacing one another with predetermined distances to define a first planar panel extending from the first transversal edge of the rear panel, a face panel extending from the first planar panel, a first interior panel extending from the face panel, and a foot flap extending from the first interior panel. The first interior panel has a cutout; the foot flap has at least one tongue disposed on an edge thereof and registers the tongue slit of the rear panel; the foot flap retains against the rear panel. Means for reinforcement connects the two side panels and is overlaid by the face panel. The second support structure distances from the first support structure, and disposes adjacent to the second transversal edge of the rear panel and encloses the second edges of the two side panels; the second support structure at least includes a second front panel, and a second interior panel; wherein the second front panel is defined with two lateral edges respectively connecting the two side panels; the second interior panel is arranged behind the second front panel, and includes at least one aperture formed thereon. The reception cavity is defined by the rear panel, the two side panels, and the first and second support structures, and the reception cavity accommodates the article therein. Two of the projections of the article are thereby restrained respectively by the cutout of the first support structure and the aperture of the second support structure.

To achieve objects of the present disclosure, a packaging blank capable of forming a display container is disclosed. The packaging blank includes a primary section, two side sections, a secondary section, means for reinforcement connecting the two side panels, and a glue flap. A plurality of sectional fold lines are set between any adjacent two of the primary section, the two side sections, the secondary section, means for reinforcement, and the glue flap. The primary section has a plurality of primary fold lines generally parallel with one another and intersected thereon to at least define a rear panel and an extension sheet. The rear panel defines a first transversal edge, a second transversal edge opposite to the first transversal edge, and two lateral edges. The extension sheet extends from the first transversal edge of the rear panel, and is intersected into a first planar panel, a face panel extending from the first planar panel, a first interior panel extending from the face panel, and a foot flap extending from the first interior panel. The primary section includes a cutout, at least one tongue slit and at least one tongue. The cutout is formed on the first interior panel and is defined by at least one restraint edge. The tongue slit is formed at a respective one of the first transversal edge and the two lateral edges of the rear panel; and the tongue is disposed on an edge of the foot flap and aligns with the tongue slit. Each of two side sections defines at least a side panel, which defines a rear edge, a front edge opposite to the rear edge, a first edge, and a second edge opposite to the first edge. At least one of the rear edge connects a respective one of the two lateral edges of the rear panel. The secondary section at least defines a second front panel connecting the two side sections. A plurality of sectional fold lines are set between any adjacent two of the primary section, the two side sections, the secondary section, means for reinforcement, and the glue flap.

Other advantages and features of the present disclosure will be fully understood by reference to the following specification in conjunction with the accompanying drawings, in which like reference signs denote like components of structure.

DETAILED DESCRIPTION OF THE DISCLOSURE

Figure 1:
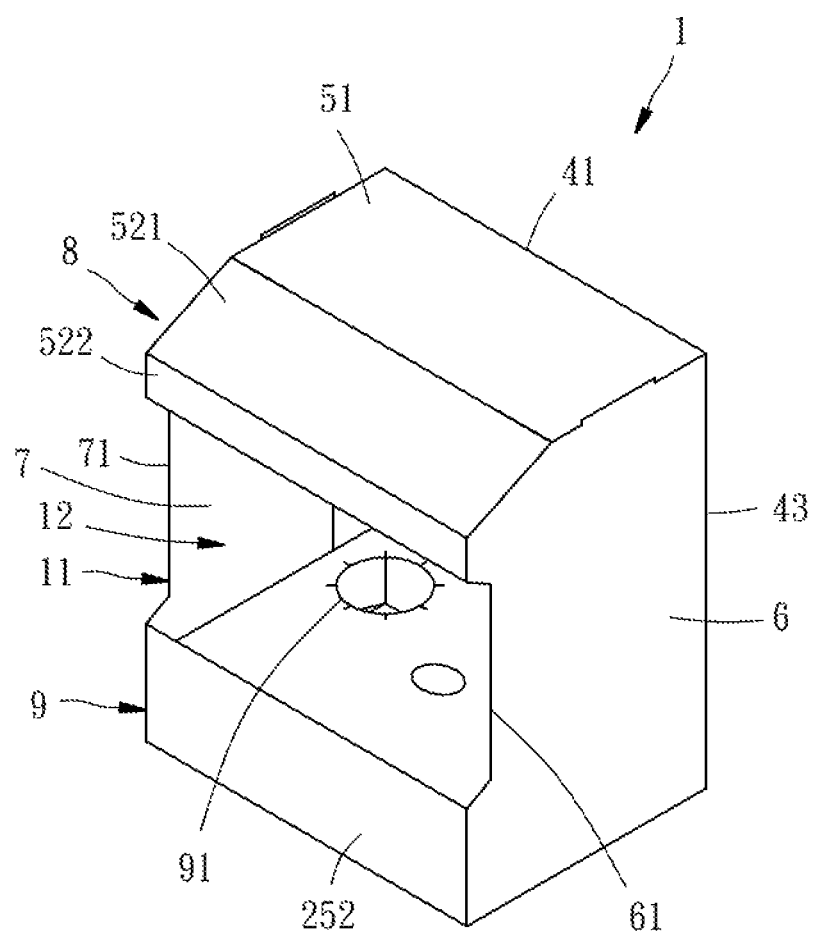
FIG. 1 is a perspective view illustrating a display container in accordance to a first embodiment of the present disclosure.
Figure 5:
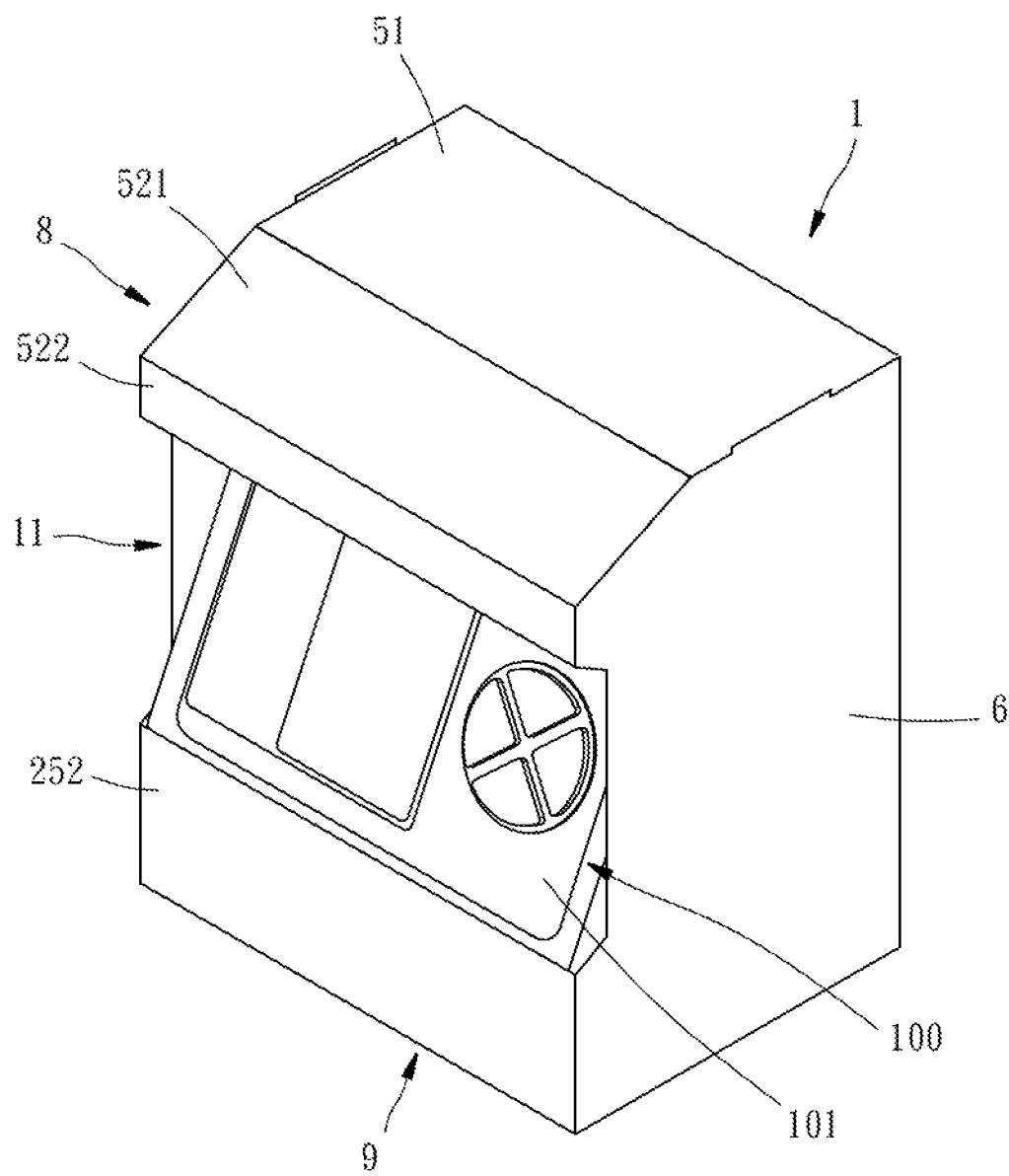
FIG. 5 is a perspective view illustrating the display container receiving a sprinkler timer device therein according to the present disclosure.

The present disclosure relates to a display container 1 as represented in FIG. 1. The display container 1 is adapted for engaging an article of heavy weight and several projections, such as a sprinkler timer device 100 (as illustrated in FIG. 5), flow meter, water distributor and the like. In the case of the sprinkler timer device 100, it is generally provided with at least two hose ports respectively arranged on top and bottom thereof, in which the two hose ports are hidden inside the display container 1, and with an operation panel on a specific face 101 thereof, which is revealed through an opening 11. Referring in FIG. 1, the opening 11 is made as large as possible in order to maximize viewing of the sprinkler timer device 100 or the specific face 101 thereof in order to reveal features of the sprinkler timer device 100 or the operation panel arranged on the specific face 101 for substantial tactile access.

The display container 1 according to the embodiments of the present disclosure will be described with reference to the drawings. Repeated description thereof may be omitted.

The display container 1 is accomplished via folding, and includes a rear panel 4, two side panels 6 and 7, means for reinforcement reinforcing a connection between the two side panels 6 and 7, a first support structure 8, and a second support structure 9. In reference with FIG. 2, the rear panel 4 defines a first transversal edge 41, a second transversal edge 42 opposite to the first transversal edge 42, and two lateral edges 43 and 44. The two side panels 6 and 7 are approximately symmetrical with each other, and each one defines a rear edge (no numeral designation) connecting a respective one of the two lateral edges 43 and 44 of the rear panel 4, a front edge 61 (71) opposite to the rear edge, a first edge (no numeral designation) corresponding to the first transversal edge 41 of the rear panel 4, and a second edge (no numeral designation, either) opposite to the first edge thereof and corresponding to the second transversal edge 42 of the rear panel 4. The first support structure 8 is disposed adjacent to the first transversal edge 41 of the rear panel 4 for enclosing the first edges of the two side panels 6 and 7; the second support structure 9 distances from the first support structure 8, and is disposed adjacent to the second transversal edge 42 of the rear panel 4 for enclosing the second edges of the two side panels.

First Embodiment

Figure 2:
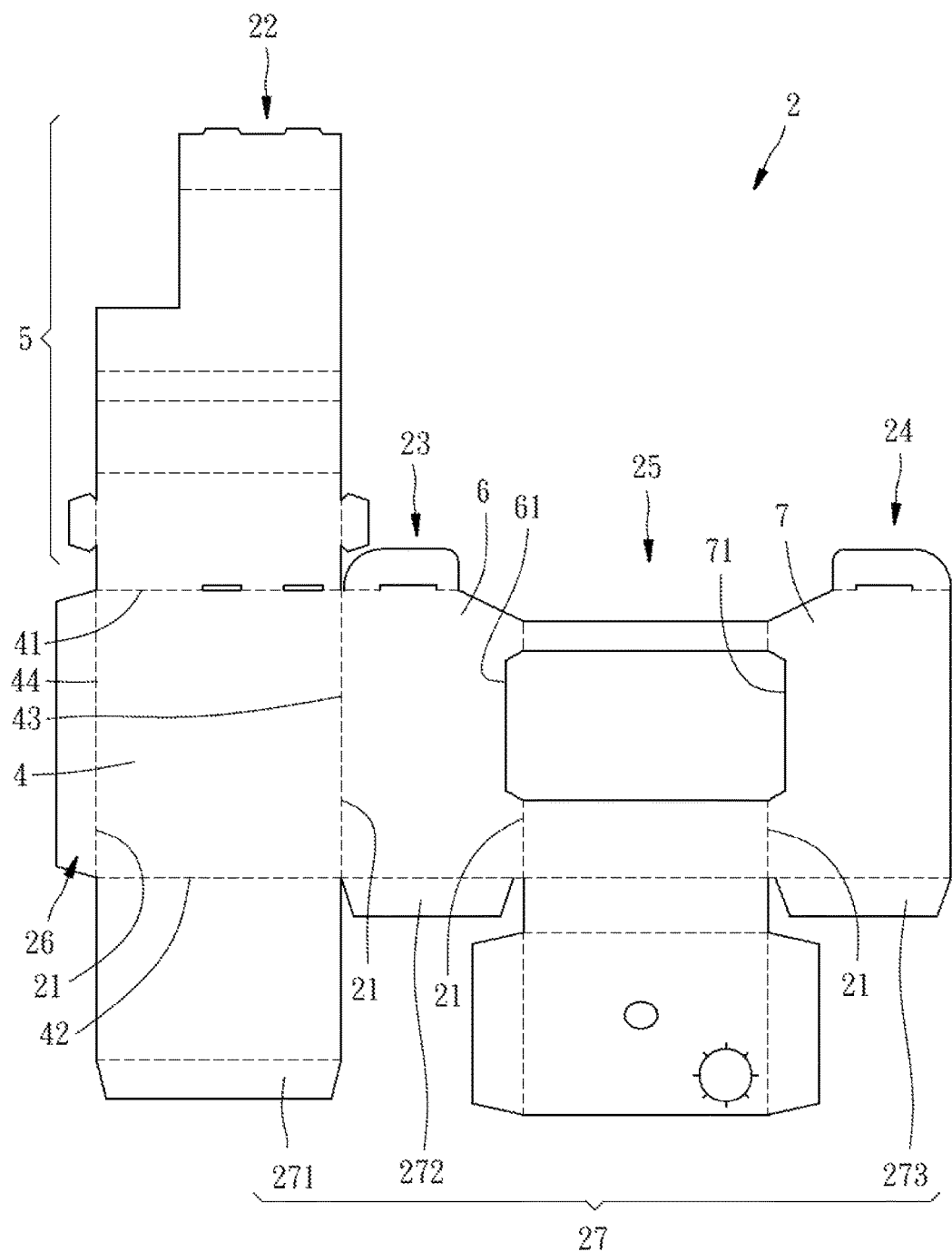
FIG. 2 is a top plan view illustrating a packaging blank for the display container according to FIG. 1.
Figure 2A:
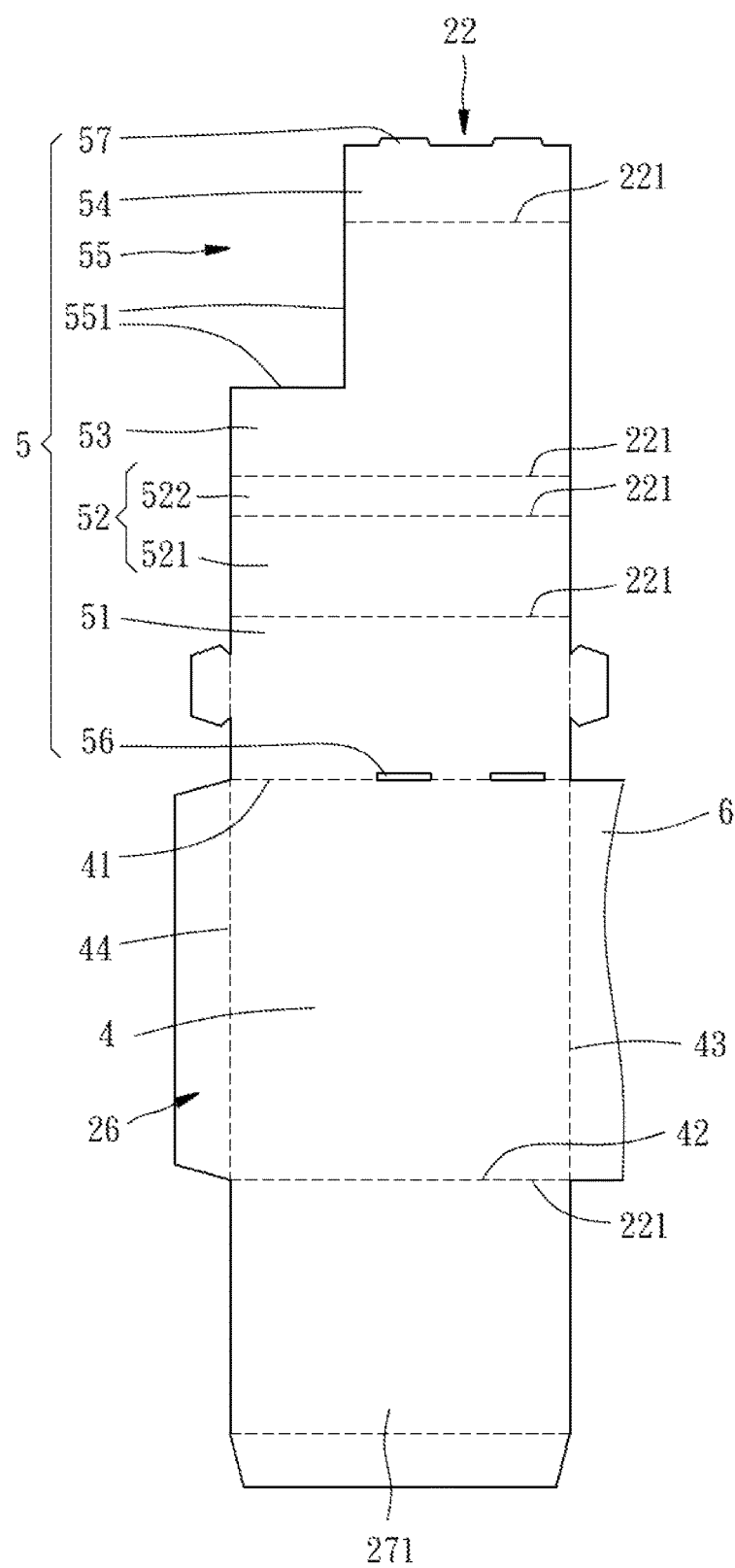
FIG. 2A is an enlarged view according to FIG. 2.
Figure 2B:
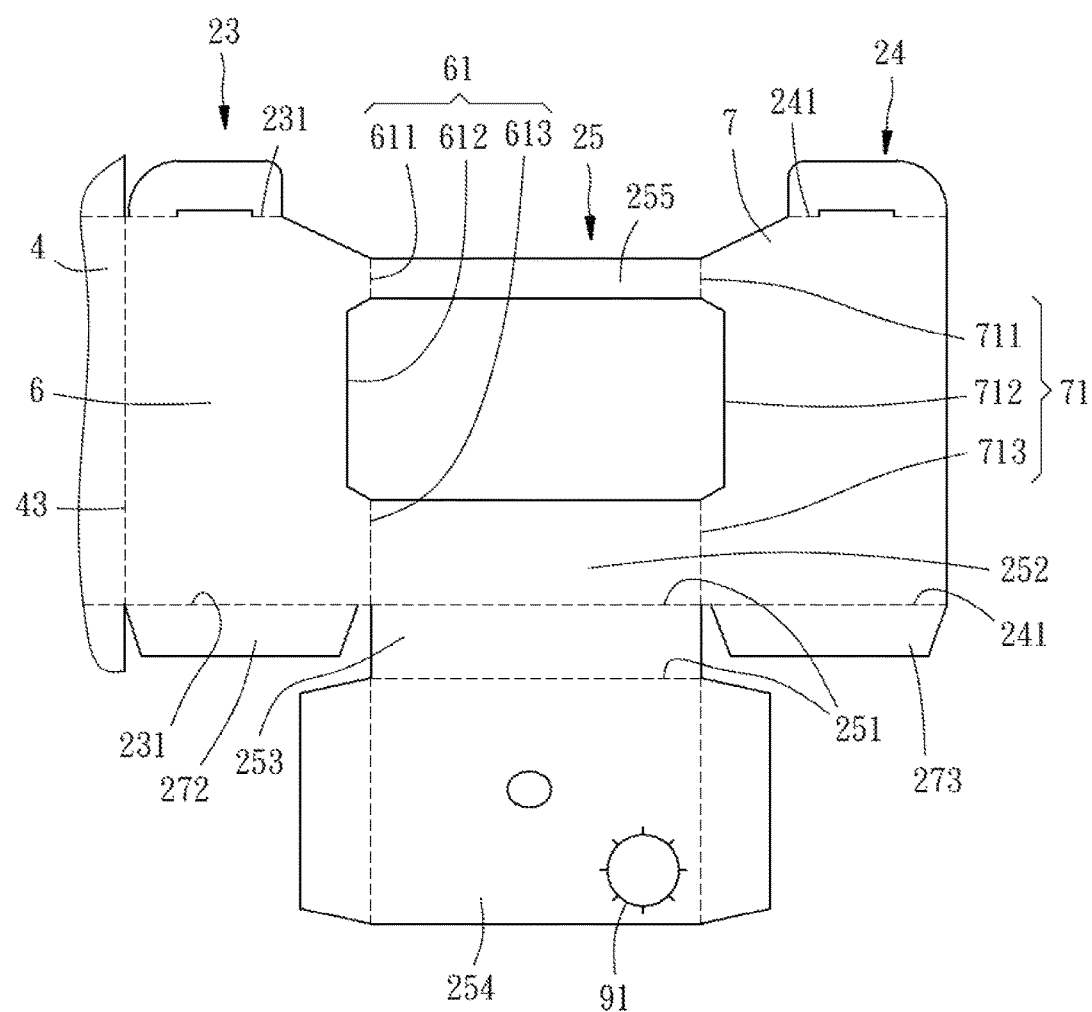
FIG. 2B is another enlarged view according to FIG. 2.

FIGS. 2, 2A, and 2B pertain to a packaging blank 2 used for constructing a first embodiment of the display container 1. The packaging blank 2 defines a plurality of sectional fold lines 21 intersected thereon to divide into a primary section 22, a right side section 23 and a left side section 24, a secondary section 25, means for reinforcement connecting the two side panels, and a glue flap 26. It would be easier to learn the packaging blank 2, if each section referring in FIG. 2 is described with at least a first edge, a second edge opposite to the first edge, and two lateral edges. The sectional fold lines 21 are parallel to one another.

The primary section 22 defines a plurality of primary fold lines 221, which are generally parallel to one another and perpendicular to the sectional fold lines 21. The primary fold lines 221 intersect the primary section to at least define the rear panel 4 and an extension sheet 5. The rear panel 4 defines the first transversal edge 41 overlying with one primary fold line 221, the second transversal edge 42 opposing with the first transversal edge 41 and overlying with another one primary fold line 221, the two lateral edges 43, 44 overlying with two adjacent sectional fold lines 21 respectively. The extension sheet 5 extends from the first transversal edge 41 of the rear panel 4, and is spaced one another with predetermined distances via the primary fold lines 221 and intersected into a first planar panel 51 extending from the first transversal edge 41 of the rear panel 4, a face panel 52 extending from the first planar panel 51, a first interior panel 53 extending from the face panel 52, and a foot flap 54 extending from the first interior panel 53. A cutout 55 is formed on the first interior panel 53. Two tongue slits 56 are formed adjacent to the first transversal edge 41 of the rear panel 4. Two tongues 57 extend from a free end of the foot flap 54 and corresponding with the tongue slit 56.

Upon completing folding and forming of the display container 1, the first support structure 8 is formed. The first support structure 8 is then formed by folding the foot flap 54, the first interior panel 53, the face panel 52, and the first planar panel 51 of the extension sheet 5 in order. The tongues 57 registers with the tongue slits 56, thereby helping the first support structure 8 keeping and retaining the shape itself. The foot flap 54 retains against the rear panel 4. Members 51 to 54 together enclose a hollow space (not shown) inside the first support structure 8, so that the respective one of the projections on the received device 100 is capable of reaching in. The cutout 55 constrains the projection disposed on top of the received device 100. The cutout 55 is described as two restraint edges 551 at a predetermined angle.

The two side sections 23, 24 are approximately symmetrical to each other. One side section 23 connects the lateral edge 43 of the rear panel 4 and a respective one of the lateral edges of the secondary section 25, while the other side section 24 connects the other one of the lateral edges of the secondary section 25. Each side section defines a plurality of side fold lines 231 (241) which are generally parallel to one another and perpendicular to the sectional fold lines 21. Each side section 23 (24) at least define the side panel 6 (7). The front edge 61 (71) of each of the side panels 6 (7) defines an upper segment 611 (711), an intermediate segment 612 (712) and a lower segment 613 (713). At least one of the two side panels 6, 7 connects a respective one of lateral edges of the rear panel 4.

The secondary section 25 defines a plurality of secondary fold lines 251 which are generally parallel to one another and perpendicular to the sectional fold lines 21. The secondary section 25 at least defines a second front panel 252 connecting the front edges 61, 71 and adjacent to the second edges of two side sections 23, 24. The second front panel 252 substantially has two lateral edges respectively connecting lower segments 613 and 713 of the front edges 61 and 71 of the two side panels 6 and 7. The secondary section 25 further includes an auxiliary panel 253 extending from the second front panel 252, and a second interior panel 254 extending from the auxiliary panel 253, due to the secondary fold lines 251.

Means for reinforcement is embodied by a reinforcement arm 255 defined by the secondary section 25 and integrally formed with the two side panels 6 and 7. Specifically, the reinforcement arm 255 connecting the upper segments 611, 711 of the front edges 61, 71 of the side panels 6, 7 together.

In further detail, the upper segment 611 (711) of the front edge 61 (71) of the side panel 6 (7) is capable of describing a plurality of boundaries in order to meet the quantity of the sub panels of the face panel 52, for corresponding with the sub panels of the face panel 52 in a respective manner. In this case, the upper segment 611 (711) defines two boundaries at a predetermined angle, a first one of the boundaries corresponds to the first sub panel 521, while a second one of the boundaries corresponds to the second sub panel 522. The reinforcement arm 255 connects the second boundaries of upper segments 611, 711 of the front edges 61, 71 so as to stay behind and be overlaid by the second sub panel 522.

A plurality of base forming flaps 27 extend from the second edges of the respective ones of these sections 22~26 and register with one another to form a hold-up connection. The hold-up connection is a well-known art and will not be fully described here. The present embodiment as illustrated in FIG. 2A discloses a tuck-end configuration formed by a second planar panel 271 extending from the second transversal line 42 of the rear panel 4 and two dust flaps 272 and 273 extending from the second edges of the side panels 6 and 7.

In further detail, the face panels 52 is partitioned into two sub panels 521 and 522 sequentially linked to one another. For further comprehension, the first sub panels 521 extends from the first planar panel 51; while the second sub panel 522 connects the first sub panel 521 and the first interior panel 53. Each of the sub panels 521 (522) defines two lateral edges generally perpendicular to the fold lines 221 set on the extension sheet 5. Therefore, the first support structure 8 could be folded in a polygonal-like configuration.

Upon completing folding and forming of the display container 1, a second support structure 9 is formed. The second support structure 9 is at least formed by the second face panel 252, the auxiliary panel 253, the second interior panel 254, and the hold-up connection.

The second interior panel 254 defines at least one aperture 91. A lateral length of the auxiliary face panel 253 is shorter than that of the second front panel 252; consequently the second interior panel 254 is set below the height of the second front panel 252 after completing folding and forming of the display container 1. The aperture 91 is made for receiving a respective one of the projections on the received device 100.

The glue flap 26 joins any two adjacent sections together and is not limited in a specific type. The glue flap 26 is formed by folding via a respective one of the sectional fold lines 21, and extends from one of the followings: the rear panel 4, two side panels 6 and 7, and the second front panel 252. In this embodiment, the glue flap 26 extends from a respective one of the lateral edges of the rear panel 4.

A reception cavity 12 is constituted by the rear panel 4, the two side panels 6, 7, the first support structure 8, and the second support structures 9 after the folding is completed. The reception cavity 12 is capable of accommodating the article, such as the device 100 shown in FIG. 19. An opening 11 is bounded by the second sub panel 522, the front edges 61 and 71 of the two side panels 6 and 7, and the second front panel 252.

In further detail, with each side section 23 (24) in this case, the intermediate section 612 (712) of the front edge 61 (71) of each side panel 6 (7) is centrally and partially recessed behind the upper and lower sections, so as to results in the perception such as, the distance between the rear edge and the intermediate segment 612 (712) of the front edge 61 (71) is shorter than one between the rear edge and the lower segment 613 (713) of the front edge 61 (71) on each side panel 6 (7).

In an alternative embodiment (not illustrated), the cutout 55 is a closed hole, therefore defining a closed edge so as to envelopes and constrains a respective projection of the device 100.

In an alternative embodiment (not illustrated), a second packaging blank is used for constructing the second support structure. The second packaging blank at least includes the second interior panel 254.

In alternative embodiment (not illustrated), an auxiliary tab extends from a foot flap 54, and the two tongues 57 are disposed on a folding edge between the foot flap and the auxiliary tab.

Second Embodiment

Figure 3:
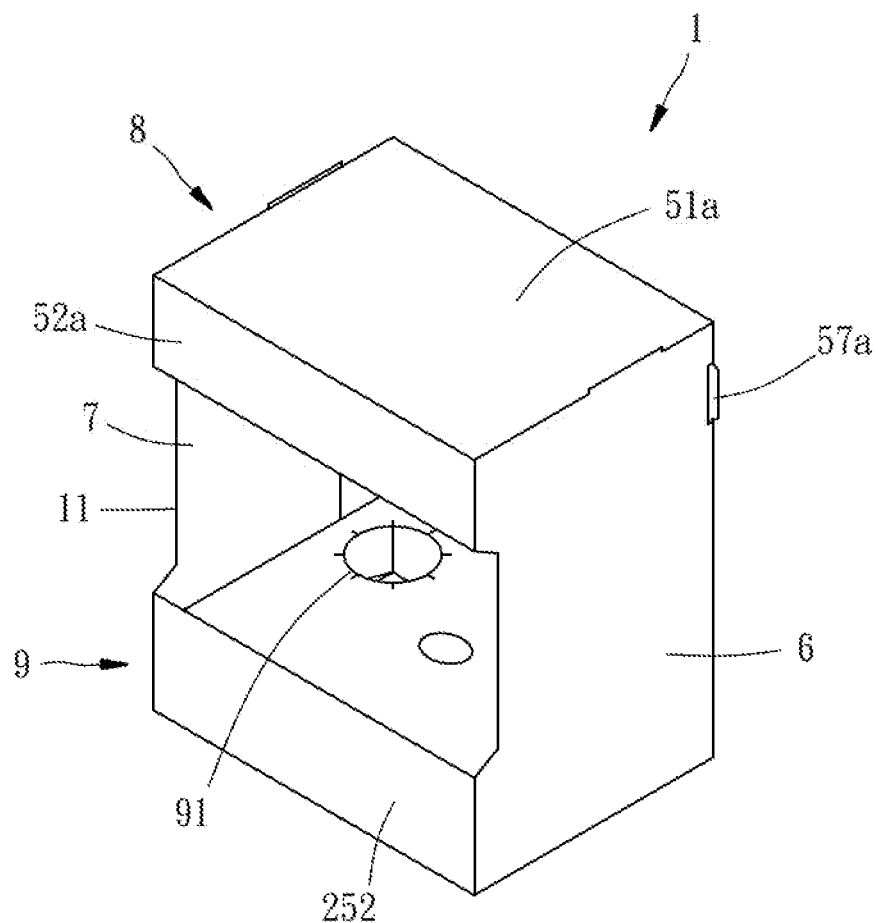
FIG. 3 is a perspective view illustrating a display container in accordance of a second embodiment of the present disclosure.
Figure 4:
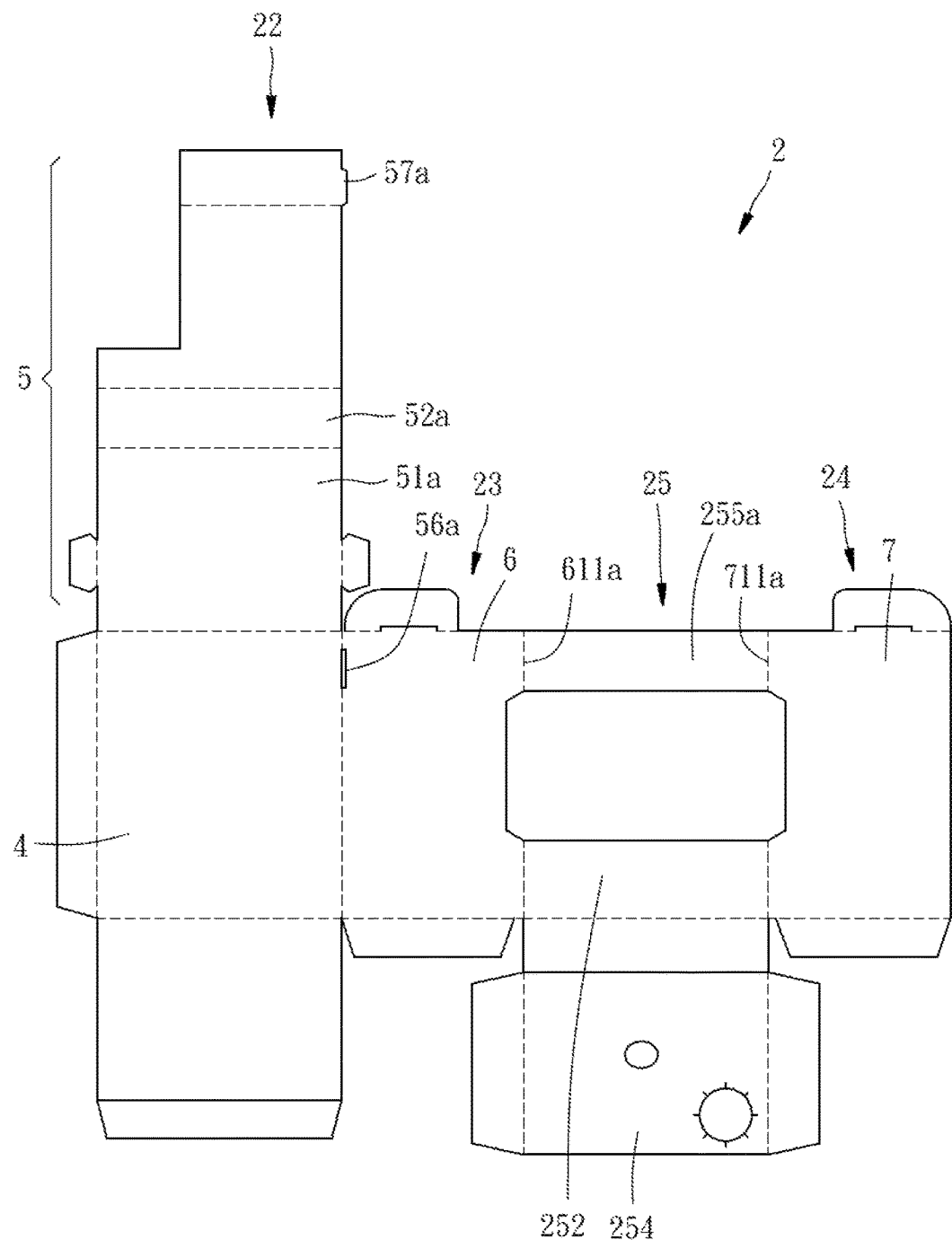
FIG. 4 is a top plan view illustrating a packaging blank a packaging blank for the display container according to FIG. 3.

FIGS. 3 and 4 pertain to a packaging blank 2 used for constructing a second embodiment of the display container 1. In the second embodiment, the face panel 52a has no partition and is construed as equivalent of the second sub panel in the first embodiment covering the reinforcement arm 255a integrally connecting an upper section 611a and 711a of the two side panels 6 and 7 together. There is no subsection of the upper segment 611a (711a), so the upper segment 611a (711a) of the front edge 61 (71) of each side panel 6 (7) corresponds to each lateral edge of the face panel 52a. The first support structure 8 thereby could be folded in rectangular configuration. A tongue slit 56a is adjacent to one sectional fold line 21 between the primary section 22 and the side section 23, and is formed on one of the lateral edges of the rear panel 4. A tongue 57a extends from a lateral side of the foot flap 54 and is capable of aligning and registering with the tongue slit 56a. A distance of the auxiliary panel 253 is shorter than that of the second front panel 252, consequently the second interior panel 254 will is set below the height of the second front panel 252 after completing folding and forming of the display container 1.

As described above, the display container 1 according to the present disclosure provides an aesthetically attractive container packaging with a substantial opening 11 while requiring minimal amount of additional base material, which is generally paper based. The cutout of the first support structure could constrain a projection of the device firm enough to keep the device from falling away and to protect the device from being lost or stolen.

In addition, means for reinforcement hidden behind the face panel and the foot flap hidden inside the first support structure 5 increase the structural integrity of the display container 1. Means for reinforcement link the two side panels together and the foot flap abuts against the rear panel 4, both make the display container 1 difficult to open.

Furthermore, the opening 11 of the display container 1 allows a full view of the specific face of the device and sufficiently substantial touch by users, and to further offer the opportunity for checking the product's quality which drives the purchase desire in modern markets. The display container 1 mentioned above according to the present disclosure still keeps the strength of the whole structure even though the opening 11 is made to be as large as possible, so that the display container can carry the sprinkler timer of heavy weight and still provide safe delivery.

The preceding description is meant to be illustrative of preferred embodiments and should not be construed as limiting the scope of the present disclosure. Various modifications, which would be readily apparent to one skilled in the art, are intended to be within the scope of the present disclosure. Accordingly, the only limitations to the scope of the present disclosure are set forth in the following claims appended hereto.

What is claimed is:

1. A display container constructed for carrying an article with a plurality of projections; the display container comprising:
    a rear panel defining a first transversal edge, a second transversal edge opposite to the first transversal edge, two lateral edges and at least one tongue slit adjacent to a respective one of the first transversal edge and the two lateral edges;
    two side panels being approximately symmetrical with each other, wherein each of the side panels defines a rear edge, a front edge opposite to the rear edge, a first edge, and a second edge opposite to the first edge; wherein at least one of the rear edge connects a respective one of the two lateral edges of the rear panel;
    a first support structure disposed adjacent to the first transversal edge of the rear panel for enclosing the first edges of the two side panels; the first support structure being folded via an extension sheet, where a plurality of primary fold lines are defined and generally parallel with one another; the primary fold lines intersecting the extension sheet and spacing one another with predetermined distances to define a first planar panel extending from the first transversal edge of the rear panel, a face panel extending from the first planar panel, a first interior panel extending from the face panel, and a foot flap extending from the first interior panel; wherein the first interior panel defines a cutout; the foot flap defines at least one tongue disposed on an edge thereof and registers the tongue slit; the foot flap retains against the rear panel;
    means for reinforcement overlaid by the face panel and linking the two side panels together;
    a second support structure distancing from the first support structure, and disposed adjacent to the second transversal edge of the rear panel for enclosing the second edges of the two side panels; the second support structure at least including a second front panel, and a second interior panel; wherein the second front panel is defined with two lateral edges respectively connecting the two side panels; the second interior panel is arranged behind the second front panel, and includes at least one aperture formed thereon; and
    a reception cavity being defined by the rear panel, the two side panels, the first and second support structures, and accommodating the article therein; whereby two of the projections of the article are restrained respectively by the cutout of the first support structure and the aperture of the second support structure.

2. The display container as claimed in claim 1, wherein means for reinforcement defines a reinforcement arm integrally formed on and connected with the front edges of side panels; the reinforcement arm is covered by the face panel.

3. The display container as claimed in claim 1, wherein the tongue slit is adjacent to the first transversal edge of the rear panel, and the tongue of the foot flap is disposed on an edge thereof, which is parallel with the primary fold lines.

4. The display container as claimed in claim 1, wherein the tongue slit is adjacent to a respective one of the lateral edges of the rear panel, and the tongue of the foot flap is disposed on an edge thereof, which is parallel with rear edge of each side panel.

5. The display container as claimed in claim 1, wherein the cutout is formed at a corner on the first interior panel, and the cutout describes at least one restraint edge to constrain the article.

6. The display container as claimed in claim 1, wherein the cutout is a closed hole formed on the first interior panel, and the cutout describes a closed edge to constrain the article.

7. The display container as claimed in claim 1, wherein each of the side panels defines an upper segment, an intermediate segment and a lower segment in order; the intermediate segment is recessed behind the upper and lower segments.

8. The display container as claimed in claim 1, wherein each of the side panels defines an upper segment, an intermediate segment and a lower segment in order; means for reinforcement connects the upper segment of the front edges of side panels.

9. The display container as claimed in claim 1, wherein the face panel of the first support structure is partitioned into a plurality of sub panels, and the first support structure is folded in a non-rectangular configuration.

10. A display container formed by folding and comprising:
    a packaging blank including:
        a primary section having a plurality of primary fold lines generally parallel with one another and intersected thereon to at least define a rear panel and an extension sheet; the rear panel defining a first transversal edge, a second transversal edge opposing with the first transversal edge, and two lateral edges; the extension sheet extending from the first transversal edge of the rear panel, and being intersected into a first planar panel, a face panel extending from the first planar panel, a first interior panel extending from the face panel, and a foot flap extending from the first interior panel; the primary section including a cutout, at least one tongue slit and at least one tongue; wherein the cutout is formed on the first interior panel and describes at least one restraint edge;

the tongue slit is formed is formed at a respective one of the first transversal edge and the two lateral edges of the rear panel; and the tongue disposes on an edge of the foot flap and aligns with the tongue slit;

two side sections, each defining at least a side panel; wherein each of the side panels defines a rear edge, a front edge opposite to the rear edge, a first edge, and a second edge opposite to the first edge; wherein at least one of the rear edge connects a respective one of the two lateral edges of the rear panel;

a secondary section at least defining a second front panel connecting the front edges and adjacent to the first edges of two side sections;

means for reinforcement connecting the two side panels; and a glue flap; and a plurality of sectional fold lines set between any adjacent two of the primary section, the two side sections, the secondary section, means for reinforcement, and the glue flap.

11. The display container as claimed in claim 10, wherein the tongue slit is adjacent to the first transversal edge of the rear panel, and the tongue of the foot flap is disposed on an edge thereof, which is parallel with the primary fold lines.

12. The display container as claimed in claim 10, wherein the tongue slit is adjacent to at a respective one of the lateral edges of the rear panel, and the tongue is disposed on an edge thereof, which is parallel with sectional fold lines.

13. The display container as claimed in claim 10, wherein means for reinforcement is embodied by a reinforcement arm integrally formed with the two side panels.

14. The display container as claimed in claim 10, wherein the face panel is partitioned into a plurality of sub panels linked sequentially with one another; each of the side panels defines an upper segment, an intermediate segment and a lower segment in order, and the upper segment is described into a plurality of boundaries corresponding to the sub panels of the face panel in a respective manner.

* * * * *